March 29, 1966   A. H. FORSMAN ETAL   3,243,590
THERMOLUMINESCENT RADIATION DOSIMETER AND INTEGRAL HEATER
Filed June 20, 1963
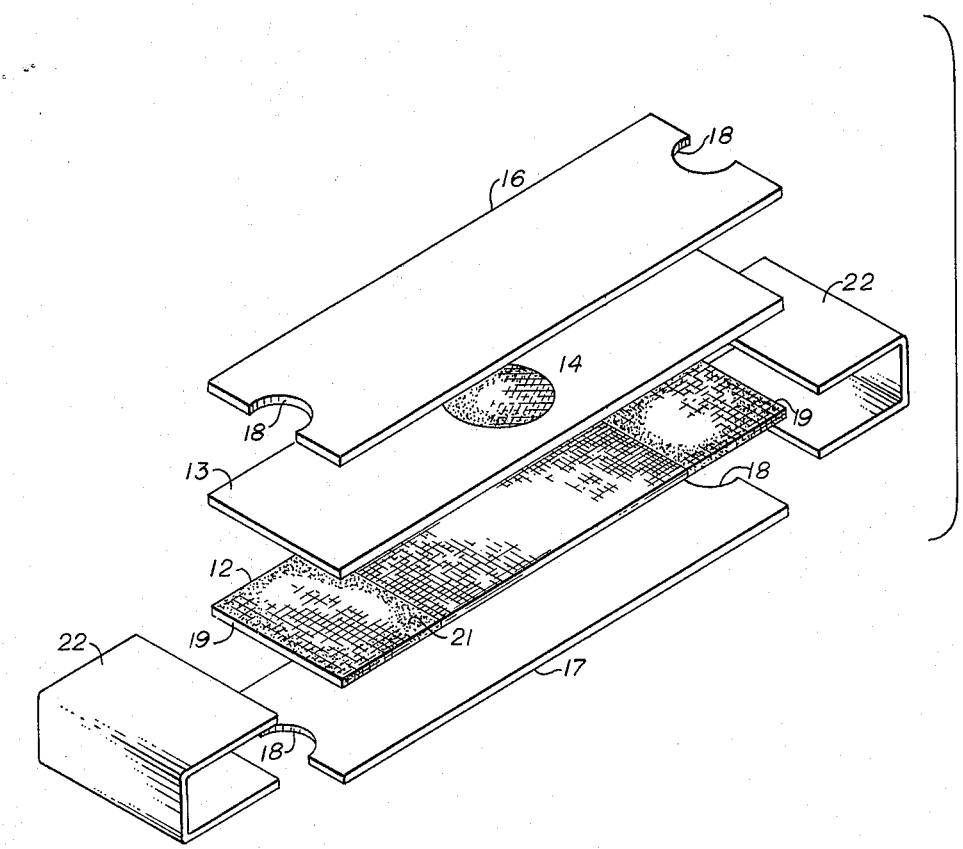
INVENTORS
ARNOLD H. FORSMAN
JAMES R. GASKILL
BY  WILLIAM A. PHILLIPS
ROBERT D. TAYLOR
ATTORNEY United States Patent Office 3,243,590
Patented Mar. 29, 1966

3,243,590
THERMOLUMINESCENT RADIATION DOSIM-
ETER AND INTEGRAL HEATER
Arnold H. Forsman, Danville, James R. Gaskill, Liver-
more, and William A. Phillips and Robert D. Taylor,
Walnut Creek, Calif., assignors to the United States of
America as represented by the United States Atomic
Energy Commission
Filed June 20, 1963, Ser. No. 289,453
5 Claims. (Cl. 250—83)

The invention described herein was made in the course of, or under, Contract W-7405-ENG-48 with the United States Atomic Energy Commission.

This invention relates to radiation dosimeters, particularly to reusable radiation dosimeters and a method for making same.

One radiation dose recording principle is based on the ability of some materials to absorb and retain an amount of energy proportional to a radiation dose. Upon heating, these materials re-emit this energy in the form of light which can be measured with available instruments. These materials are called thermoluminescent materials.

A preferred dosimetric material is lithium fluoride, having impurities of about .1% magnesium, on the order of .01% calcium and traces of aluminum, iron, titanium and silicon. Such materials are readily available commercially. Hereinafter the term "dosimetric lithium fluoride" shall be used to denote lithium fluoride having induced crystal imperfections to enhance its thermoluminescence and improve the linearity of the radiation dose dependence in the dose range of $0-10^5$ R of gamma radiation.

In spite of the advantages of dosimetric lithium fluoride, the film badge, relying on radiation sensitive photographic emulsions, is still the universally used badge means of monitoring radiation exposure of personnel, although the film badge is not accurate and requires much labor in evaluation. This is mainly due to the fact that there has never been a compact thermoluminescent dosimeter which can be evaluated without the use of a comparative method or otherwise by complicated apparatus requiring at least the same amount of handling and processing labor.

The present invention, comprising dosimetric lithium fluoride, a conducting, resistive base which is incorporable into an electric network for use as an electric heater, and a heat resistant, heat conducting solid binder, affixing the dosimetric lithium fluoride in a solid dispersion intimately onto the heater base, provides a thermoluminescent radiation dosimeter which integrally combines the dosimetric material and a heater into a small, low mass-high surface area composite. This dosimeter, by virtue of its design is capable of giving dose readings instantaneously and possesses excellent heat transfer characteristics, enabling it to be heated and cooled rapidly. The dosimetric lithium fluoride is disposed in a thin, tough deposition having excellent light transfer characteristics. It requires no protective cover needing to be removed for readout. The dosimeter is directly evaluated by registering the light energy released on a scale calibrated in radiation units, rather than by comparative techniques. These recited advantages and others serve to provide a dosimeter superior to all others now known.

Accordingly it is an object of the present invention to provide a radiation dosimeter which is small and economical to manufacture and can be worn in badge form by personnel.

A further object of the invention is to provide a radiation dosimeter which is sensitive in the millirem range and is capable of recording radiation doses to high accuracies. One further object of the present invention is to provide a radiation dosimeter which is reusable.

Another object of the present invention is to provide a dosimeter which allows easy recovery of recorded exposure data.

An additional object of the invention is to provide a radiation dosimeter which is adaptable to automatic evaluation of data to enable radiation monitoring of large segments of the civilian population.

Other objects and advantages will be apparent to those skilled in the art upon consideration of the following description in conjunction with the attached drawing showing in the single figure an exploded view in perspective of a preferred embodiment of the invention.

Referring now to the drawing, the numeral 12 designates a thin rectangular base of graphite cloth which is impregnated with potassium silicate to retard oxidation. A thin ceramic strip 13 of substantially the same width as the graphite cloth but shorter in length has a dosimetric lithium fluoride deposit 14 on one of its surfaces. The ceramic strip must be unaffected by temperatures up to 400 degrees and be a porous material such as glass fiber matte. The lithium fluoride deposit is in the form of small dosimetric lithium fluoride crystals dispersed in a matrix of solidified potassium silicate which bonds together the individual lithium fluoride crystals and the ceramic strip. Potassium silicate is also used to join the graphite cloth base 12 to the ceramic strip 13 at the surface opposite the lithium fluoride layer. The composite of the base 12 and ceramic strips 13 with the lithium fluoride deposit 14 may be enclosed on top and bottom by thin protective mica platelet windows 16 and 17. These mica platelets 16 and 17 as used in this preferred embodiment of the dosimeter have cutouts 18 at the ends. The width of the mica platelets is substantially the same as that of the graphite cloth, while their length is intermediate between that of the graphite cloth base and the ceramic strip 13. Again potassium silicate serves as the adhesive by means of which the mica platelets are glued into place.

Endsection 19 of the graphite cloth 12, not covered by the mica platelets 16 and 17, are impregnated and covered with silver paste 21 to improve the conduction of electricity into the graphite cloth. Nickel end tabs 22 are crimped over and completely cover the exposed endsections 19 of the graphite cloth base and the cutouts 18 of the mica platelets.

A preferred method of manufacture of the personnel radiation dosimeter of the present invention comprises the cutting of graphite cloth into rectangular sections and soaking them in potassium silicate to retard oxidation. Potassium silicate has been found satisfactory for use as an oxidation retardant, adhesive and binder as well. A preferred potassium silicate solution for all these applications may be represented as a 29% water solution of silica and potassium oxide in the weight ratio of 2.2.

To obtain the dosimetric lithium fluoride-containing body, a cylindrical tube with open ends is placed in vertical position onto a strip of porous ceramic material. The tube has the same diameter as the desired lithium fluoride deposit. The tube is filled with potassium silicate solution dispersed in which is an amount of dosimetric lithium fluoride. This amount of lithium fluoride can be varied according to the desired dosimetric capacity and sensitivity of the lithium fluoride matrix. An average amount of lithium fluoride for a personnel badge is 300 mg. The process of settling lithium fluoride from a dispersion in a potassium silicate solution is very slow and can be greately accelerated by adopting the procedure of filtering the dispersion through a porous ceramic material by suction. A porous ceramic is selected over other materials since ceramics are heat resistant and upon conclusion of the filtering process the fine pores remain filled with potassium silicate whence heat transfer characteristics are improved. During the filtration care is taken to break the vacuum exactly at the time when the meniscus of the liquid level reaches the lithium fluoride deposit on the ceramic base. In this manner the interstices between the lithium fluoride crystals remain completely occupied by potassium silicate solution. The ceramic slab with the lithium fluoride deposit and the interstitially remaining potassium silicate solution is dried and baked at about 70° C. for at least 1 hour, preferably about 3 hours, after which they form an integral solid slab.

The ceramic strip is now ready for mounting onto the graphite cloth base by wetting both the graphite cloth surface and the surface of the ceramic strip opposite the lithium fluoride deposit with potassium silicate, and pressing together. The mica cover plates are then glued over the lithium fluoride deposition with potassium silicate solution. The endsections are covered with silver paste, and nickel endplates are crimped over these endsections and pressed firmly together. The dosimeter is again baked at about 70° C. for about 3 hours, after which it is ready for use.

The above dosimeter and construction method may be modified, for example, in place of graphite cloth other resistive conductors capable of being bonded to the lithium fluoride could be used. Similarly, other binders may be used as long as they meet the prerequisites of being stable over the operating temperatures and possess good heat transfer characteristics. Also the mica cover may be deleted where protection from excessive punishment is not deemed necessary. Furthermore, the lithium fluoride can be deposited in a wafer like slab of a solidified binder and joined to the graphite cloth base directly. As is apparent from the preceding description, the ceramic disc is included in the dosimeter solely for the purpose of expediting the process of manufacturing the dosimeter. An alternative method of forming a lithium fluoride deposition would be to allow the crystals to settle from a binder solution by gravity and then drawing off the supernatant liquid. This method would be of use especially when the lithium fluoride is deposited onto mica plates directly. Finally, each dosimeter may be marked in a suitable manner to allow identification of each individual dosimeter to be carried out by the readout machine.

*Example*

A radiation dosimeter was constructed according to the description of the preferred embodiment of the invention. A ceramic disc carrying a deposition of 300 mg. of lithium fluoride in a potassium silicate matrix was fastened onto a graphite cloth section 1 and ½ inches long and 1 inch wide with potassium silicate. The endsections of tthe graphite cloth were provided with nickel contacts.

This dosimeter was exposed to various radiation doses from a cobalt 60 source. Thereafter, an electric current of 11 amps at a voltage of 6 volts was passed through the base to heat the dosimeter to 400 degrees centigrade. The emitted light was photoelectrically measured during the heating process with an EMI 9536 photomultiplier tube and the data relayed to a digital recording system. Thereafter, the dosimeter was air cooled for reuse. The entire operation of evaluation and cooling required less than 20 seconds per dosimeter while a film badge requires 5 minutes of development time along. The recorded radiation doses proved accurate to within 5% over the dose range of 0–5 R.

In view of the numerous alternate embodiments in which the present dosimeter may be realized without departing from the spirit of the invention its scope should be limited only by the following claims.

What is claimed is:

1. A personnel radiation dosimeter for incorporation into an automatic readout system including contact terminals connected to a high amperage circuit for resistive heating, light sensing and recording means, said dosimeter comprising:
   (a) dosimetric granular lithium fluoride,
   (b) a section of electrically resistive graphite cloth,
   (c) contact means electrically connected to said graphite cloth at spaced locations for contacting said contact terminals thereby closing said high amperage heating circuit,
   (d) radiation and light transparent inorganic binder means embracing said lithium fluoride granules and pervading said graphite cloth, binding said dosimetric lithium fluoride onto said resistive graphite cloth.

2. The radiation dosimeter of claim 1 wherein said binder means is potassium silicate.

3. The radiation dosimeter of claim 2 further defined in that said potassium silicate is comprised of potassium oxide and silica dioxide in a weight ratio of 2.2:1.

4. A personnel radiation dosimeter for incorporation into an automatic readout system including contact terminals connected to a high amperage circuit for resistive heating, light sensing and recording means comprising;
   (a) granular dosimetric lithium fluoride,
   (b) a section of electrically resistive graphite cloth,
   (c) electrical contact means for contacting said terminals, said electrical contact means being electrically connected at spaced location on said section of graphite cloth,
   (d) a thin slab porous ceramic base,
   (e) radiation and light transparent inorganic binder means embracing said granular lithium fluoride in an outer portion of a solid matrix of said binder means and pervading said porous ceramic base and said graphite cloth.

5. The radiation dosimeter of claim 4 further defined in that said binder is potassium silicate comprised of potassium oxide and silica dioxide in a weight ratio of 2.2:1.

References Cited by the Examiner

UNITED STATES PATENTS

| | | | |
|---|---|---|---|
| 2,616,051 | 10/1952 | Daniels | 250—71 |
| 2,996,402 | 8/1961 | Feldman | 117—33.5 |
| 2,998,323 | 8/1961 | Feldman | 117—33.5 |
| 3,115,578 | 12/1963 | Schulman | 250—71 |
| 3,141,973 | 7/1964 | Heins | 250—71 |
| 3,174,393 | 3/1965 | Dewey | 250—84 |
| 3,176,133 | 3/1965 | McCall | 250—71.5 |

RALPH G. NILSON, *Primary Examiner.*

JAMES W. LAWRENCE, *Examiner.*